United States Patent [19]

Anderson et al.

[11] Patent Number: 4,831,839
[45] Date of Patent: May 23, 1989

[54] AERATOR PROPORTIONER FOR A GRAVITY FEED FROZEN COMESTIBLE FREEZER

[75] Inventors: Donald A. Anderson, Kiel; Philip L. Davis, Elkhart Lake; Theodore J. Salkowski, Grafton, all of Wis.

[73] Assignee: Stoelting, Inc., Kiel, Wis.

[21] Appl. No.: 117,956

[22] Filed: Nov. 9, 1987

[51] Int. Cl.$^4$ .............................................. A23G 9/20
[52] U.S. Cl. ...................................... 62/308; 137/512
[58] Field of Search ............. 62/308; 137/512, 533.11, 137/594, 606

[56] References Cited

U.S. PATENT DOCUMENTS

| | | | |
|---|---|---|---|
| 4,045,976 | 9/1977 | Mills | 62/308 |
| 4,221,117 | 9/1980 | Martineau | 62/306 |
| 4,412,428 | 11/1983 | Grannella et al. | 62/308 |
| 4,617,802 | 10/1986 | Fiedler | 62/308 X |

FOREIGN PATENT DOCUMENTS 724723 10/1931 France ................................. 137/512

Primary Examiner—William E. Tapolcai
Attorney, Agent, or Firm—John C. Cooper, III; C. Thomas Sylke; Arnold J. Ericsen

[57] ABSTRACT

A frozen comestible freezer with a freezing chamber, a receiving chamber, and a tank of liquid comestible fed to the receiving chamber through an aerator proportioner which provides the correct proportion of liquid comestible and air for the freezing chamber. The aerator proportioner further contains means for isolating pressure exerted by the comestible product in the chamber from the combined pressures exerted by the liquid comestible and atmospheric pressure of air admitted into the receiving chamber, and thereby minimize backflow concerns brought about by pressure imbalance.

1 Claim, 2 Drawing Sheets

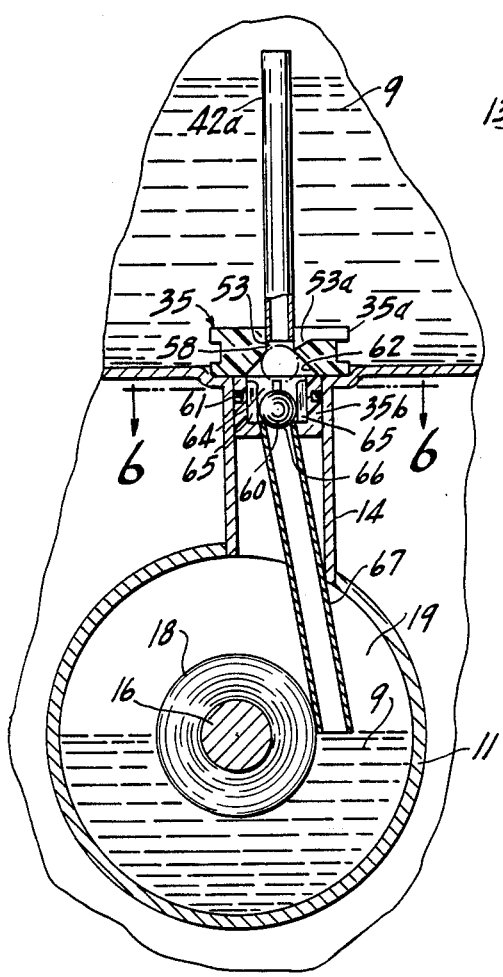
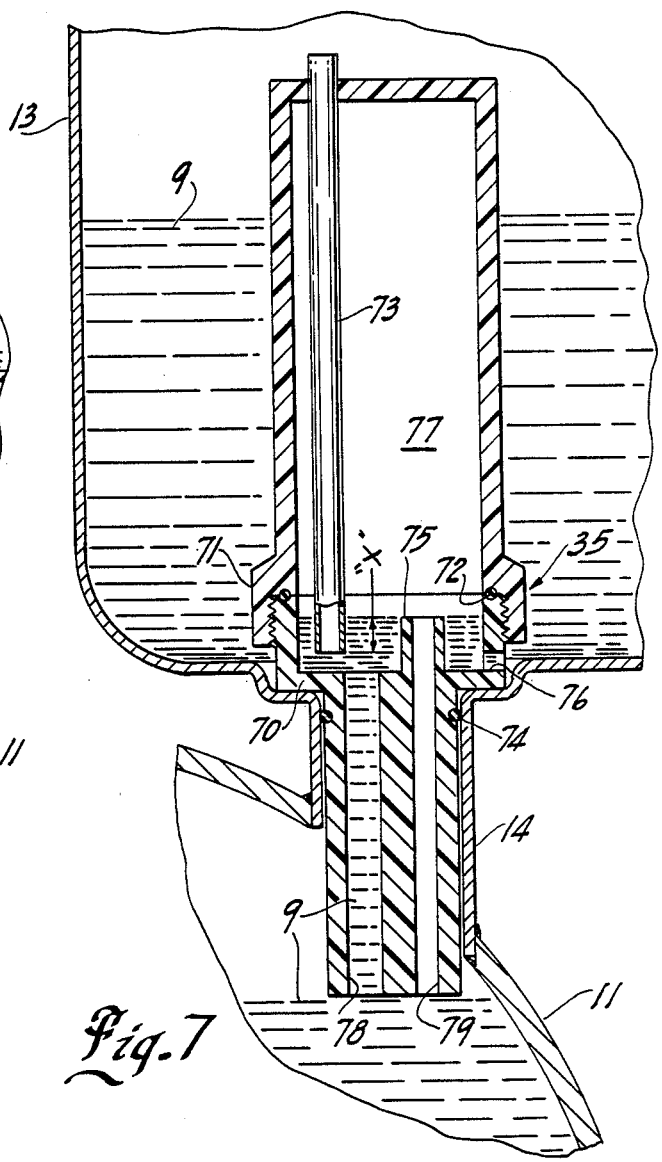
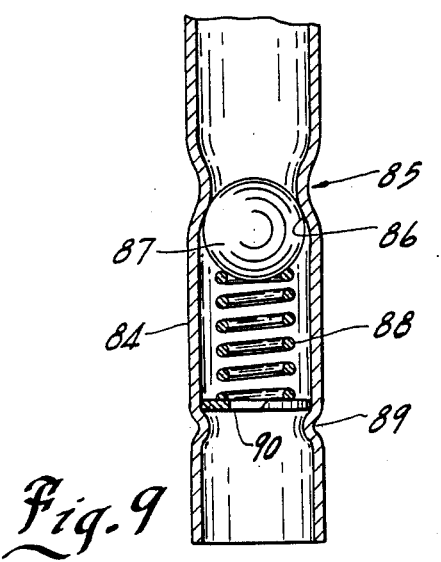
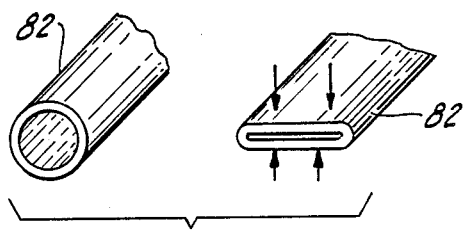
Fig. 5
Fig. 7
Fig. 9
Fig. 8

4,831,839

AERATOR PROPORTIONER FOR A GRAVITY FEED FROZEN COMESTIBLE FREEZER

BACKGROUND OF THE INVENTION

1. Field of the Invention

This invention relates to frozen comestible freezer/dispensers, and particularly to a modified liquid/air proportioner or carburetor containing check valve means for preventing backflow of discharged materials and air due to an imbalance of pressure which may occur when withdrawing frozen comestible from the freezer chamber.

2. Description of Related Art

U.S. Pat. No. 4,221,117, assigned to the same assignee as the present application, disclosed a prior art device for proportioning a liquid comestible with air enroute from a liquid comestible tank to a freezing chamber in which the liquid comestible and air are blended and cooled to a serving consistency. The patent disclosed an improvement over earlier devices having a similar function. The patented improvement eliminated adding air to the liquid comestible via a single tube which often created air bubbles in the liquid comestible in the combined air and liquid fill tube. The patented improvement accomplished this by utilizing a pair of tubes wherein the aerator proportioner, or carburetor, had a feed tube solely for liquid comestible and an air tube solely for air.

Although the U.S. Pat. No. 4,221,117 disclosure provided a distinct improvement over the single tube devices, when placed in an actual working environment, there have been instances noted where when withdrawing the product there is created a low pressure in the freezer/dispenser unit tending to draw the product and air into the unit in undesired proportions due to the unequal pressures.

SUMMARY OF THE INVENTION

The proportioner or carburetor of the present invention provides an improvement over prior art devices the form of a "check valve" means for either or both the air supply and the liquid comestible supply to the proportioner or exit therefrom to the receiving chamber. The check valve means provides for retention of the desired proportion of air and feed, which at times in the past has been lost because of a pressure imbalance existing in the hopper or receiving tank when compared to back pressure in the freezing chamber or barrel.

The check valve means may take various forms, and the preferred mode at present utilizes a "check valve" means wherein each through-bore of the bushing member includes a "cage" portion providing an inverted seat having a configuration arranged to receive a floating closure member, such as a ball or other object conforming to the seat if and when pushed upwardly by fluid entering the bottom of the bushing member due to undesirable pressure imbalance. Closure thereby prevents the fluid from rising in the respective tube.

Another uses flaps made of resilient, elastomeric material supported by a bushing member secured to the lower end of individual air and liquid comestible supply tubes, the bushing member has a pair of through-bores communicating with each of the respective tubes and normally closed at the opposite ends of the respective through-bores by the resilient flaps.

Other embodiments of the "check valve" means are also disclosed herein. The term "check valve" is intended to be considered in its broadest sense to define various closures which automatically prevent backflow of air and/or liquid comestible due to a differential in pressure which may cause the mix to rise into the carburetor or aerator proportioner. For instance, it is conceivable, as herein disclosed, to provide a "trap", not unlike a "bell jar", where the air tube comprises two separate sections, the upper opening of the lower section of the member extending to the mix level in the enclosed receiving tank. The upper opening of the upper air tube section extends outwardly from the enclosed receiving tank, with its lower opening extending into the mix and below the upper opening of the lower section. Thus, if the mix should rise in the chamber, air will be entrapped thereabove, not unlike a "bell jar", and after being compressed to a predetermined volume, the pressure of the compressed air will prevent the mix from rising above a predetermined level. Obviously, the second mentioned tube will have its end raised above that predetermined level above which the mix will not pass. Other embodiments will be hereinafter discussed, each of which incorporate the inventive concept disclosed herein.

The proportioner, or carburetor, may also be configured to provide a chamber having two entrance openings, one in connection with liquid comestible and the other with air by means of a tubular extension rising above the liquid comestible level, and with a single exit communicating with a freezer mixing barrel. The chamber contains a check ball valve for closing of either or both entrance openings should there be a pressure imbalance.

DESCRIPTION OF THE DRAWINGS

FIG. 5 is a fragmentary cross-section taken approximately across lines 5—5 of FIG. 1, but illustrating another embodiment of the present invention;

FIG. 7 is a fragmentary sectional view of a modified plug member illustrating the present invention in still another embodiment;

FIG. 8 is a fragmentary view of an inlet air tube modified to disclose still another embodiment of the present invention;

FIG. 9 is a fragmentary view of still another modified air inlet tube providing another embodiment of the present invention.

DESCRIPTION OF THE PREFERRED EMBODIMENT

Figure 1:
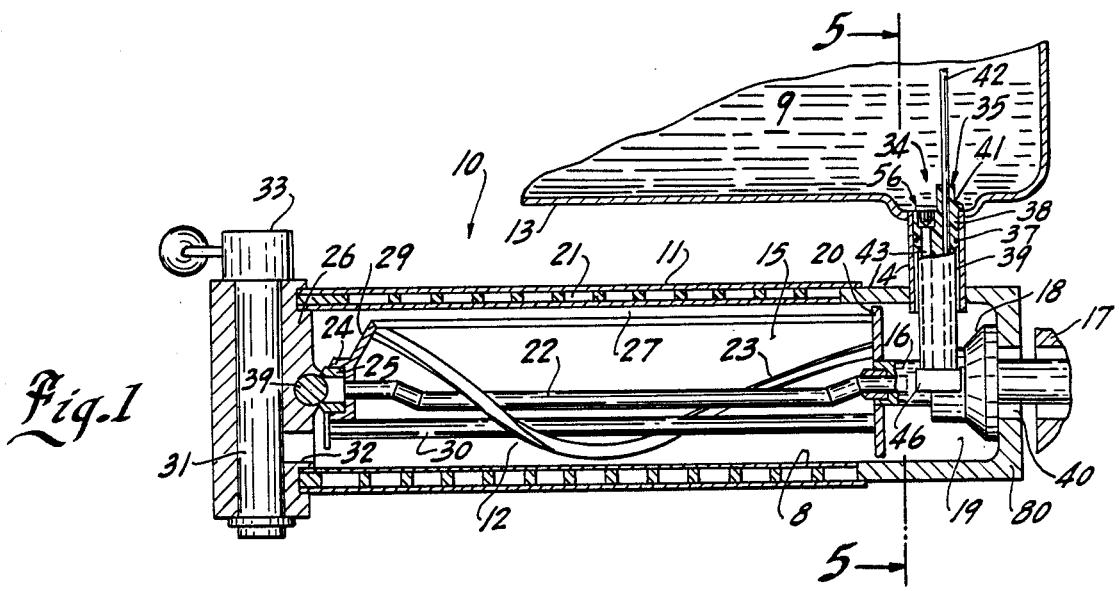
FIG. 1 is a fragmentary vertical longitudinal section taken through a frozen comestible freezer embodying the present invention.

The present invention provides an improvement to frozen comestible freezers, such as that described in U.S. Pat. No. 4,221,117. As was disclosed therein, and with reference to FIG. 1 herein, a frozen confection freezer 10 comprises a horizontally elongated cylinder 11 enclosing a cylindrical freezing chamber 15 having its inner wall 8 cooled by refrigeration ducts 21. Freezing chamber 15 contains an auger type blender, agitator and aerator 12 mounted for rotation substantially on the axis of the cylinder 11. Liquid comestible 9 in tank 13 is fed through a through-bore 43 of a molded plug member 35. Air enters tube 42 and both comestible 9 and air are fed through the pipe or passageway 14 into the receiving chamber 19, which is adjacent freezing chamber 15 and partially partitioned therefrom by the disk 20.

The aerator and agitator 12 may be made in any desired form. It draws liquid confection 9 and air from receiving chamber 19 through the peripheral gap between disk 20 and the wall 8 of cylinder 11 and agitates, mixes and blends the air and liquid to aerate the liquid and cool the aerated mixture to the desired serving consistency. The proportion of air and liquid in the final mix will depend upon the proportion of air and liquid in receiving chamber 19, and this depends upon the proper functioning of the proportioner hereinafter described.

The illustrated aerator and agitator 12 has a drive shaft 16 mounted at one end on an external bearing 17. The opening 40 in the end wall 80 of freezer 11 through which drive shaft 16 extends is sealed by a rubber cup seal 18. Drive shaft 16 carries the disk 20 to which ends of auger blade 23, scraper blade 27 and stay rod 30 are attached. At the end of the blender 12 remote from the disk 20 there is a bearing hub 24 which is supported on a bearing boss 25 from the end wall or door 26 which closes the end of freezing chamber 15. Hub 24 carries a bracket 29 to support the respective ends of scraper blade 27 and auger blade 23 which are remote from disk 20. Hub 24 also supports the end of stay rod 30 at its end remote from disk 20. When drive shaft 16 is turned by a motor (not shown), the stay rod 30, scraper blade 27 and auger blade 23 rotate as a unit. Blender bar 22 is held stationary by its anchor rod 39 which is seated in a corresponding groove in the side of end wall 26.

The end wall 26 of freezing chamber 15 has a dispenser nozzle 31 with a handle 33 by which frozen confection of serving consistency is dispensed from the freezing chamber 15 through duct 32.

The aerator proportioner 34 in passage 14 includes a mounting plug 35. It desirably has an intermediate portion 36 which seats into the passage 14 and is sealed thereto by O-ring 37. The upper level portion 38 of the plug 35 is considerably elevated above the bottom wall of tank 13 and is provided with a peripheral finger grip portion 41 so that it can be readily grasped by an operator for purposes of manual manipulation of the plug for inserting it into the passage 14 and removing it therefrom.

Plug 35 provides support means for air tube 42 and contains a liquid comestible full through-bore 43 in the lower portion 39. Air tube 42 extends through the plug 35 and through the upper level portion 38 thereof, and downwardly into the lower portion 39. The lower portion 39 of the plug 35 extends into the passage 14 into the receiving chamber 19. The air tube 42 also extends upwardly from the plug 35 above the level of the liquid comestible 9 in tank 13, so as to have its upper end exposed to the air of the atmosphere.

The level of the plug may be finger adjusted to change the proportion or over-run of air to liquid in the final mixture. When frozen confection is drawn from the dispensing spout 31, and blender 12 is rotating, it draws liquid 9 and air from the receiving chamber 19 into freezing chamber 15. This lowers the level of liquid 9 in receiving chamber 19 and uncovers the lower ends of air tube 42 and through-bore 43. Liquid 9 wil then flow by gravity and suction from tank 13 through the bore 43 into receiving chamber 19. Air will be drawn by suction down air tube 42 into receiving chamber 19. The flow rates in tube 42 and bore 43 will be uniform and precise because each carries only air or liquid and no attempt is made to mix the two in these tubes. When the liquid level rises in chamber 19 to or above the lower ends of plug portion 39 both liquid flow and air flow into receiving chamber 19 is simultaneously stopped. Accordingly, the proportion of air to liquid is automatically regulated by the rising and falling level of liquid 9 and the initial adjustment of the level of the lower ends of portion 39 in receiving chamber 19.

The upper end of the fill through-bore 43 terminates at the bottom of a cup-like valve cage receiver 44 of the plug 35.

Figure 2:
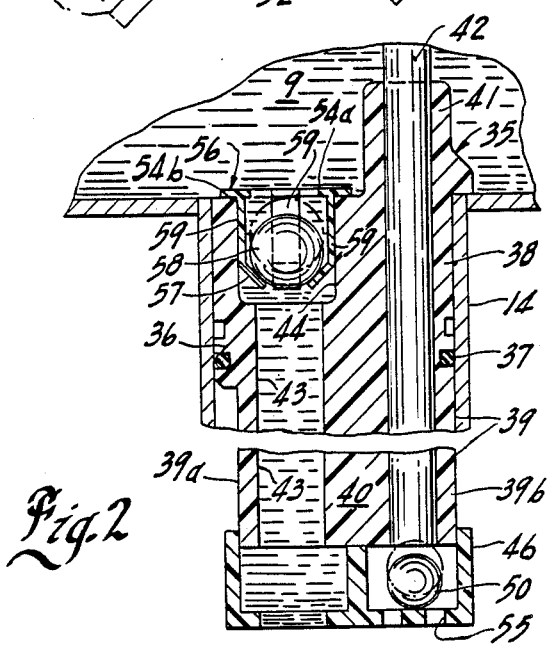
FIG. 2 is a fragmentary enlarged view of a bushing member containing air and delivery tubes and/or portions containing through-bores, shown in FIG. 1, and utilizing entrapped or caged closure members to provide check valve means for the respective through-bores.

The improvement provided by the present invention is in the form of check valve means, variations of which are disclosed in FIGS. 2-9, inclusive. A preferred embodiment, as illustrated in FIGS. 1 and 2 comprises the plug member 35 including an intermediate portion 36, and an upper portion 38 and a lower portion 39. As aforestated, the intermediate portion 36 is provided with an integral groove acting to receive an O-ring 37 for sealing the plug 35 with respect to the passage member 14. The lower portion 39 is preferably divided into two sections 39a and 39b, the section 39a including the through-bore 43 and the section 39b arranged to receive the lower end of the tube 42. Portion 39 is preferably constructed to provide a separation wall 40 at its lower end to permit the portion 39 to receive a bushing member 46 which may be slipped over and secured to the lower end of the section 39a and 39b and which is arranged to receive an air check ball 50 in its cup-like interior. The bushing 46 is perforated with a plurality of apertures 55 at the lower end thereof to permit entry of air from the tube 42. It will be apparent that any backflow from the chamber 19 will be blocked by means of the ball 50 engaging the lower opening of the tube 42.

The liquid 9 enters the plug 35 through the upper opening formed by inwardly extending flange portion 54a of a check valve insert cage 56 received in the cup 44 of the plug 35. The insert cage 56 is provided with a tapered seat 57 for receiving a ball 58. The lower end of the valve seat is slotted between fingers 59 to permit egress of the liquid 9 into the through-bore 43. The insert 56 may be snapped into place in the cup 44 by finger pressure. It thus becomes accessible for cleaning operations. It will be apparent that any backflow of liquid comestible 9 tending to enter either or both the air tube 42 or the through bore 43 will be checked by one or both balls 50 and 58 (see phantom positions) respectively forced against the opening at the bottom of tube 42 and the apertured seat formed by the inwardly extending flange 54a of the insert cage 56. The outwardly extending flange 54b provides a shoulder for supporting the cage 56 at the top exposed surface of the upper portion 38 of the plug member 35.

Figure 3:
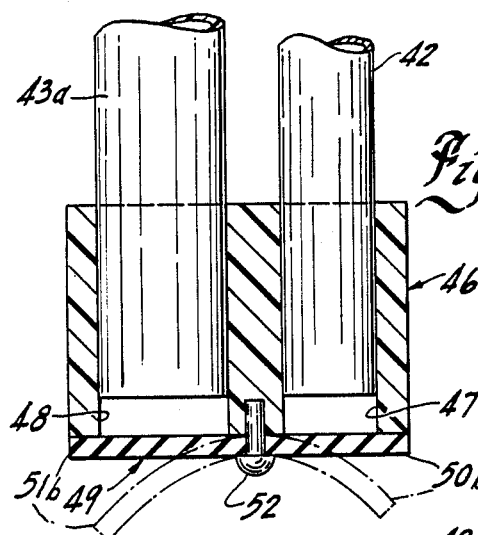
FIG. 3 is a fragmentary enlarged view of a bushing member inserted at the lower end of air and liquid comestible delivery tubes and utilizing resilient flaplike members normally closing the lower ends of the respective tubes.

In the embodiment of FIGS. 3, a bushing member 46a molded of plastic material is secured to the bottom of separate delivery tubes 42 and 43a. Tube 43a delivers liquid comestible 9 similar to through-bore 43 of the embodiment of FIGS. 1 and 2. The bushing 46a contains two through-bores 47 and 48 communicating respectively with the lower ends of the tubes 42 and 43, being secured thereto by force fit and/or applied adhesive. Located at the bottom surface of the bushing member 46a is a resilient flap member 49 formed from an elastomeric material and providing separate check valves in the form of laterally extending flap portions 50 and 51. The portions 50 and 51 normally act as closures for the through-bore 47 and 48 of the bushing member 46. The flap member may be secured to the bottom of the bushing member 46 by means of a rivet or other suitable attachement means.

The phantom position of the flap portions 50 and 51 are shown in FIG. 3 to indicate the open position of the flap member check valve upon demand of either air through the tube 42 or liquid comestible through the tube 14 as required on demand by opening the dispenser nozzle 31 during serving of a frozen confection. Either or both of the check valve flap portions 50b and/or 51b will prevent backflow of material from the receiving chamber 19 should there be an air pressure imbalance between the pressure of the freezing chamber 15 and the atmospheric pressure exerted on the liquid comestible 9 and the air entering the tube 42.

Figure 4:
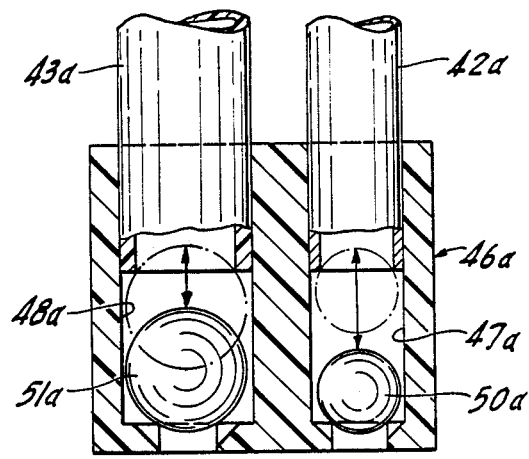
FIG. 4 is a fragmentary enlarged view of another embodiment of this invention similar to the embodiment of FIGS. 1 and 2, but illustrating retained ball closures disposed in a separate bushing member located at the lower end of a pair of air and liquid delivery tubes.

A modification of the embodiment of FIGS. 1 and 2 may be observed by the "ball-type" check valves of FIG. 4. The phantom lines shown the balls 50a and 51a in closure position against the respective lower ends of delivery tubes 42a and 43a, respectively, upon the occurance of a pressure imbalance.

Figure 6:
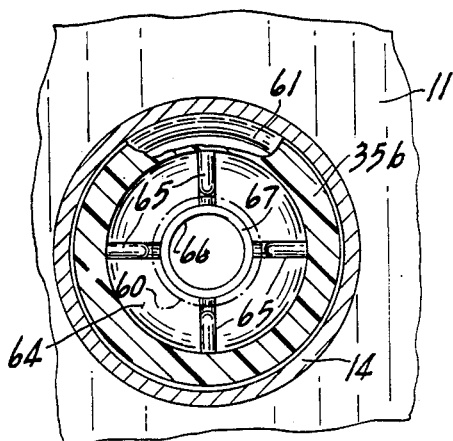
FIG. 6 is a cross-sectional view taken along lines 6—6 of FIG. 5.

Another embodiment of similar performance is described with reference to the view of FIG. 5. This embodiment utilizes a single air tube 42a and a modified plug 35 molded in two parts 35a and 35b which are joined together as shown in FIG. 5. The top portion 35a is formed to provide a shoulder 53 for receiving the lower end of the air tube 42a. The shoulder 53 opens up into a recessed entrance 53a for receiving comestible 9. Both the lower end of the tube 42a and the inner portion of the entrance recess 53a communicate with a chamber 58, which at its lower end defines a ball seat 62 arranged for reception of a floating ball member 60 during closure of the chamber 58. (Obviously, if required because of consistency, texture or ingredients, the ball may be spring biased towards closure by means of a helical spring located directly below the ball (not shown)). The bottom portion 35b of the plug 35 is provided with a sealing gasket, which may be in the form of an O-ring 61. With reference to FIG. 6, the internal chamber 64 includes a plurality (4 in this case) of inwardly projecting ridges 65 to support the ball during flow of the comestible 9 and air entering from tube 42a. The structure prevents accidental closure of the exit opening 66 and its discharge tube 67 secured thereto.

It will be apparent that the embodiment of FIGS. 1, 2 and 3 may readily be retrofitted to existing systems, such as the apparatus disclosed in the aforementioned U.S. Pat. No. 4,221,117, whereas the ball-type check valve of FIGS. 4–6, inclusive, may be utilized on newer machines as they are introduced to the marketplace.

With reference to FIG. 7, it will be observed that a "bell jar" version of a check valve for a proportioner or carburetor may also be utilized. In this embodiment, the plug 35 may also be in the form of a two-part member. That is, the lower portion 70 is externally threaded to receive a threaded inverted cup-like portion 71 and which is sealed thereto by means of an O-ring 72 seated in matching grooves formed in both members 70 and 71. The upper portion provides a "bell jar" air lock and further supports an air tube 73 extending above the level of the liquid comestible 9 and externally of member 70. The tube 73 is secured to the member 71 by conventional means such as an adhesive or heat seal. It will be apparent from FIG. 7 that the length of the tube is sufficient to extend below the height of a tubular extension 75 intergrally molded with the lower portion 70 of the plug 35. The distance "X" between the ends of the tube 73 and the tubular extension 75 is a function of the head pressure, which, in turn, is dependent upon viscosity and may be determined by experimentation. The tube 73 may be fitted to the upper portion 71 by thread means (not shown) or other means for permitting the tube 73 to be raised or lowered to vary the distance "X". The lower portion of the plug 35 is supplied within an inlet opening or entrance 76 and the aforementioned tubular extension 75 will determine the height of the level of the liquid 9 which will be substantially equivalent to the height of the trapped air within the "bell jar" chamber 77. The lower portion 70 is further sealed by O-ring 74 against tube 14 to prevent leakage of liquid 9. The lower portion 70 is further formed to provide air and mix chambers 78 and 79, respectively.

Other possibilities for restricting air flow to prevent backflow due to pressure imbalance are within the province of the present invention. For instance, as shown in FIG. 8, the air tube 82 may be of a soft, squeezable material that collapses when the change in pressure increases and pops open during a dispensing operation upon opening of handle 33. This embodiment suggests utilizing a stiff air inlet tube 84 as disclosed in FIG. 9. Here, the tube is provided with a constriction 85 acting, at its lower inner bore to provide a seat arrea for receiving a ball or other check valve member having a configuration conforming to the seat 86 from movement within the bore of the tube 84. The ball 87 may be of the floating variety or may be provided with a spring 88 and washer 90 bearing, at its opposite end, against a lower tubular constriction 89.

Thus, the present invention provides for an improved non-pressurized frozen comestible freezer having the features of previous freezers but without backflow pressure problems due to an imbalance of pressure in the freezer chamber when compared to the pressure of the liquid comestible contained in a supply tank plus the air pressure entering a carburetor or aerator proportioner.

What is claimed is:

1. In a non-pressurized frozen comestible freezer having a freezing chamber in which a mixture of liquid comestible and air are blended and cooled to a serving consistency, an air and liquid comestible receiving chamber adjacent to and communicating with said freezer chamber, a supply tank for liquid comestible, a passage between said tank and receiving chamber, and aerator proportioner communicating with said passage and having a first entrance for receiving liquid comestible from said supply tank, a second separate entrance for receiving an air delivery tube, the improvement in which said aerator proportioner is provided with check valve means for isolating the pressure exerted by the comestible product in said freezing chamber from the combined pressures exerted by the liquid comestible and the atmospheric pressure of the air admitted to the receiving chamber from the aerator proportioner, said check valve means comprising a bushing member including a pair of through bores respectively communicating with said air delivery tube and with said liquid comestible supply tank, and ball-type closures in each of said through-bores arranged to close the openings of the respective air delivery discharge tube and the liquid comestible supply tank due to pressure imbalance.

* * * * *